United States Patent [19]
Saito

[11] 4,027,923
[45] June 7, 1977

[54] PRESSURE REDUCER DEVICE

[75] Inventor: Yuichi Saito, Tokyo, Japan

[73] Assignee: Nissan Motor Co., Ltd., Yokohama, Japan

[22] Filed: Dec. 23, 1975

[21] Appl. No.: 643,707

[30] Foreign Application Priority Data

Dec. 25, 1974 Japan .............................. 49-147941

[52] U.S. Cl. ................................ 303/6 C; 137/87; 137/505.25; 188/349; 303/84 A

[51] Int. Cl.² ........................................... B60T 8/26

[58] Field of Search ....................... 188/151 A, 349; 303/84 A, 6 C; 137/87, 505.25; 251/63, 205

[56] References Cited
UNITED STATES PATENTS

| | | | |
|---|---|---|---|
| 2,488,647 | 11/1949 | Teague, Jr. .................... | 137/505.25 |
| 2,633,147 | 3/1953 | Badami ........................... | 303/84 A |
| 3,410,612 | 11/1968 | Lepelletier .................... | 188/349 X |
| 3,649,084 | 3/1972 | Stelzer .......................... | 188/349 X |
| 3,663,067 | 5/1972 | Yabuta .......................... | 188/349 X |

*Primary Examiner*—George E. A. Halvosa

[57] ABSTRACT

A pressure reducer device, particularly for hydraulic brake systems in motor vehicles comprises a housing having a chamber, a differential area piston movable within the chamber having a passage through which pressure is transmitted from a high pressure chamber to a low pressure chamber, and a sleeve fixed to the housing and disposed in the high pressure chamber. The differential area piston is movable in the sleeve to open and close the passage to perform a pressure modulating operation on the fluid transmitted from the high pressure chamber to the low pressure chamber.

6 Claims, 5 Drawing Figures

PRESSURE REDUCER DEVICE

The present invention relates to a pressure reducer device, particularly for hydraulic brake systems in motor vehicles.

In a pressure reducer device, variation in pressure is effected by causing a delivery pressure from a master cylinder to act on one of the faces of a two-diameter or compound piston movable within a cylinder the bore of which comprises two sections substantially matching the piston diameters, and by causing a working pressure in wheel brake cylinders to act on a face of the piston opposite to the face acted upon by the delivery pressure.

The above-mentioned known device further provides sealing members adapted to prevent liquid flow between the inner cylinder walls and piston periphery, the faces on the piston defining within the cylinder a first chamber connected with the master cylinder, and a second chamber connected with the wheel brake cylinders.

The known device further comprises a reaction spring interposed in the second chamber between the piston and cylinder, the spring being mounted under a sufficient initial load to oppose displacement of the piston towards the second chamber till the pressure initially transmitted by the master cylinder to the first and second chambers reaches the above-mentioned predetermined value. For convenience the first chamber will be referred to as high pessure chamber in order to distinguish from the first or low pressure chamber.

The device is moreover provided with a passage through which pressure is transmitted from the high pressure chamber to low pressure chamber and with a valve to open and close the passage. The passage comprises the peripheral clearance between the large piston diameter section and corresponding wall of the cylinder bore. The valve comprises a lip seal of a rubber interposed between the large diameter piston section and corresponding wall of the cylinder bore. The lip seal is formed with a valve seat adapted to be engaged by the large piston diameter section. The valve normally opens the passage to admit free liquid flow from the high pressure chamber to low pressure chamber and closed the passage to intercept the flow when the pressure in the high pressure and low pressure chamber reaches a predetermined valve, the valve opening again when the pressure in the chambers drops beneath the predetermined value.

Such a pressure reducer device as mentioned above is subject to the disadvantage that the lip seal may be cracked or splitted, shortening an operating life of the device. Besides the device has the disadvantage that the lip seal may be collapsed to dislocate the valve seat formed thereon, varying pressure reducing characteristics of the device upon each operation of the same.

The present invention aims at lengthening the operating life of and stabilizing the pressure reducing characteristics of the pressure reducer device.

It is an object of the present invention to provide a pressure reducer device in which a valve to open and close a fluid passage interconnecting a high pressure chamber and a low pressure chamber does not use a lip seal that is commonly used in the pressure reducer device presently in use.

It is a specific object of the present invention to provide a pressure reducer device which may have a longer operating life as compared with the pressure reducer device presently in use.

It is another specific object of the present invention to provide a pressure reducer device which may provide a stable pressure reduction characteristics over its operating life.

It is still another specific object of the present invention to provide a pressure reducer device which is simpler and less expensive in construction and more reliable in operation as compared with the pressure reducer device presently in use.

The present invention will become more apparent from the following description in connection with the accompanying drawings, in which.

Referring to the accompanying drawings, like reference numerals are used throughout all Figures to designate like parts.

Figure 1:
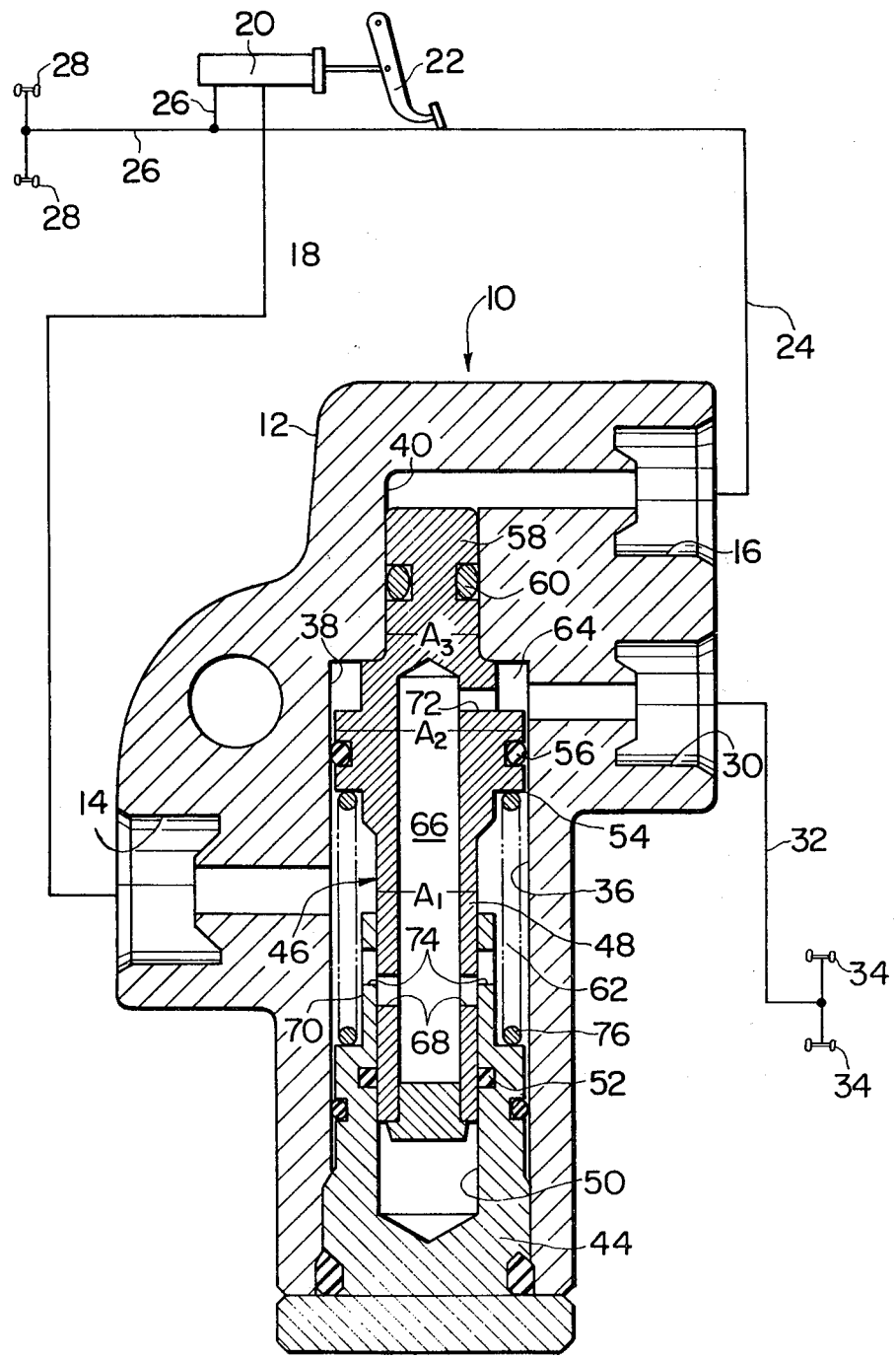
FIG. 1 is a sectional view of a pressure reducer device constructed in accordance with the present invention, shown in association with a schematically illustrated brake system.

Referring first to FIG. 1, a pressure reducer device is indicated generally at 10 and includes a housing 12 provided with inlet openings 14 and 16. The inlet opening 14 is connected by a brake line 18 to a master cylinder 20 operated by the usual foot pedal 22. The inlet opening 16 is connected by a brake line 24 to a brake line 26 which leads from the master cylinder 20 to front brake cylinders 28. The brake lines 18 and 24 receive brake fluid under pressure from separate pressure developing portions of the master cylinder 20. The housing 12 also has an outlet opening 30 which is connected by a brake 32 to rear wheel brake cylinder 34.

The housing 12 is formed with a chamber 36 which is defined by coaxial, consecutively arranged bores 38 and 40. The chamber 36 is closed at one end of the housing 12 by means of a threaded plug 44 and is open at its other end to the inlet opening 16.

A differential area piston or pressure responsive valve element 46 is positioned within the chamber 36 for the purpose of modulating the flow of fluid from the inlet opening 14 to the outlet opening 30. Modulation occurs only at higher levels of brake pressure, however. At lower applied pressures the valve element 46 remains in its illustrated position which permits the free flow of fluid through the chamber 36 from the inlet opening 14 to the outlet opening 30. It will be seen that the valve element 46 includes a cylindrical portion 48 which is slidably supported within a bore 50 of the plug 44, the bore 50 being opened to the ambient atmosphere. The cylindrical portion 48 is sealed around its outer periphery by a seal 52 seated against the wall of the bore 50 of the plug 44. The cylindrical portion 48 is closed at an end nearer to the plug 44.

The valve element 46 has a piston or land 54 which is slidably disposed within the bore 38 and is sealed around its periphery by a seal 56. An extension 58 at remote end of the valve element 46 from the plug 44 is slidably disposed within the bore 40 and is sealed around its periphery by a seal 60. It will be noted that the piston 54 divides the bore 38 into a lower or high pressure chamber 62 which communicates with the inlet opening 14 and into an upper or low pressure chamber 64 which communicates with the outlet opening 30.

The cylindrical portion 48 is formed with a closed bore 66 and with a group of valve ports 68 at wall portion that is at all times closed by an integral hollow sleeve 70 extending into the lower chamber 62 from the upper end of the plug 44. An opening 72 is formed at wall portion of the cylindrical portion 48 that is exposed to the upper chamber 64. The sleeve 70 is formed with valve ports 74 mating to the valve ports 68, respectively. The valve element 46 is held in the position illustrated by a coil spring 76 which is compressed between the piston 54 and the upper end of the plug 44. In this illustrated position the valve ports 68 open to the lower chamber 62 through the valve ports 74 and thus free flow of the fluid from the lower chamber 62 to the upper chamber 64 is established through the valve ports 74, 68, bore 66 and opening 72.

The manner of operation of the pressure reducer device 10 and its functional relation to the brake system as a whole will now be described. Upon the application of the brakes, fluid is delivered from the master cylinder 20 directly to the front brake cylinders 28 through the brake line 26. Front brake pressure will also flow through the brake line 24 to the inlet opening 16 and apply a force to upper end of the extension 58 of the valve element 46. Fluid will also flow from the master cylinder 20 through the brake line 18 to the inlet opening 14. This fluid is entirely separate from the brake fluid delivered to the front brake cylinders 28 and its pressure is developed by separate pressure producing means within the master cylinder 20. From the inlet opening 14 fluid flows to the lower chamber 62, thence through the valve ports 74 of the sleeve 70, valve ports 68, into the bore 66 and through the opening 72, into the upper chamber 64. Fluid is then free to flow from the outlet opening 30 through the brake line 32 to the rear brake cylinders 34.

Assuming that the pressure developed within the brake lines 18 and 26 are the same, the brake pressures initially developed in the rear brake cylinders 34 and front brake cylinders 28 will also be the same. This condition continues to obtain during the lower ranges of applied braking effort. When a predetermined level of pressure is achieved, however, the valve element 46 will move in a downward direction to cause the sleeve 70 to close the valve ports 68 and thereafter modulate the pressure which is transmitted to the rear brake cylinders 34. This movement of the valve element 46 results from the various forces which are applied to it. The relationship of these forces can be expressed mathematically. For this purpose the following symbols will be used:

$A_1$ = the cross-sectional area of the cylindrical portion 48.
$A_2$ = the cross-sectional area of the land 54.
$A_3$ = the cross-sectional area of the extension 58.
$P_M$ = the pressure delivered to the inlet opening 14 and at the lower chamber 62.
$P_R$ = the pressure at the rear brake cylinders 34 and at the upper chamber 64.
$P_F$ = the pressure at the front brake cylinders 28.
$F$ = the force of the spring 76.

Using these symbols, the valve ports 68 will be closed by the sleeve 70 when $P_F A_3 + P_M(A_1 - A_3) > F$. After this point the valve ports 74 of the sleeve 70 will stay in lap position with the mate ports 68 bleeding small amounts of fluid past it to transmit further pressure increases to the rear brakes 34 at a reduced level as determined by the following equation:

$$P_F A_3 + P_R(A_2 - A_3) = P_M(A_2 - A_1) + F$$

From the foregoing it will be apparent that each increment in $P_M$ will produce a predetermined lesser increment in $P_R$. This will continue so long as $P_F$ is equal to $P_M$. However, if a complete failure occurs in $P_F$, then it will be apparent that $P_R$ must be substantially increased in order to satisfy the equation. Accordingly a failure in the front brake pressure system will eliminate the substantial reduction in pressure transmitted through the pressure modulating device 10 to the rear brakes. As a consequence, $P_R$ will be much closer to $P_M$ than was the case prior to the failure of front brake pressure.

It will now be seen from the foregoing that according to the teachings of the present invention, pressure modulation is performed by a sleeve valve that is constructed of the hollow sleeve 70 and the cylindrical portion 48 slidably fitted in the sleeve 70 and that the use of the sleeve valve causes the pressure reducer device 10 to extend its life because no excessive stress occurs during the opening and closing operation of the valve.

Besides, the component parts of the sleeve valve are made of rigid material, i.e., metal, providing stable pressure reducing characteristics over the operating life of the device.

Figure 2:
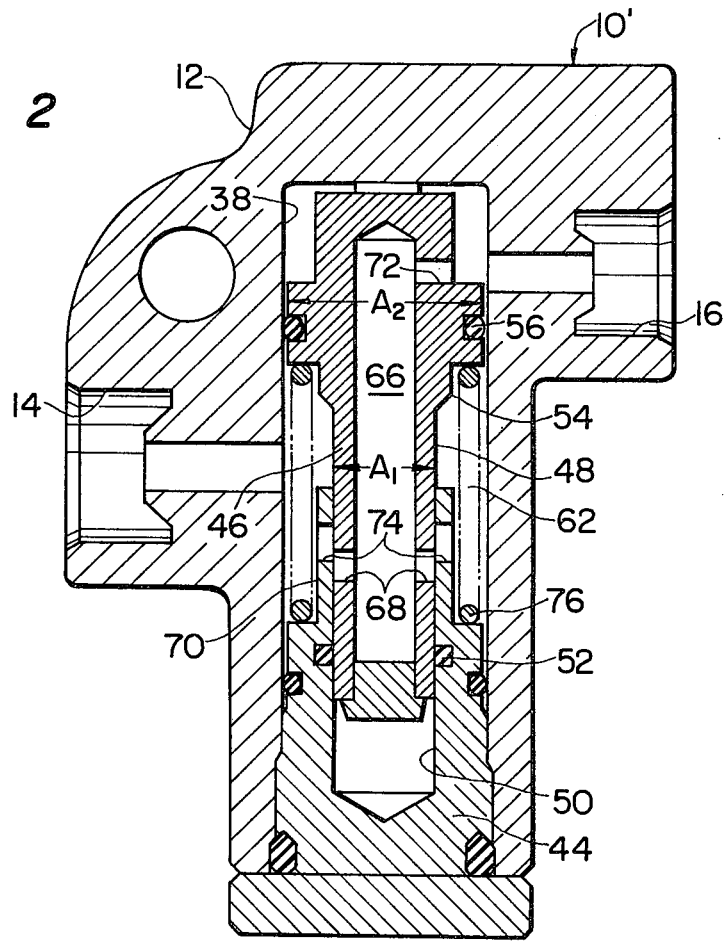
FIG. 2 is a similar view to FIG. 1 showing a second preferred embodiment of the present invention.

In the first embodiment described in the foregoing, the teachings of the present invention is embodied in the pressure reducer device 10 designed for use in a dual hydraulic brake system and the device 10 is provided with the feature that the end of the extension 58 is exposed to the front brake pressure for the purpose that the pressure reducing character differs between the case where the front brake is sound and the case where the front brake fails. The present invention, however, is not limited to this application. The invention can be equally embodied in a pressure modulating device which is not provided with the above-mentioned feature. Such embodiment is illustrated in FIG. 2, in which the reference numeral 10' designate a pressure reducer device which eliminates the above-mentioned feature.

Figures 3A, 3B:
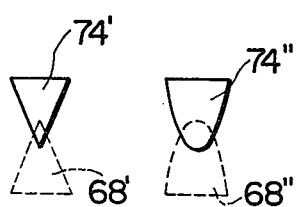
FIGS. 3a and 3b are diagrammatic views showing modifications of valve ports.

Each of the valve ports 74 formed in the sleeve 70 and the mating one of the valve ports 68 formed in the cylinder portion 48 should preferably be shaped such that as the cylinder portion 48 moves from one dead position to the other dead position, an opening area of the sleeve valve varies substantially quadraticly. Two examples are shown in FIGS. 3a and 3b, in which corresponding valve ports to those of FIG. 1 or FIG. 2 are designated by the same reference numerals but with a prime or two primes, respectively. By so shaping, the stroke of the valve element 48 during pressure reducing operation is reduced. As a consequence kinetic movement of the valve element 48 will be stabilized.

Figure 4:
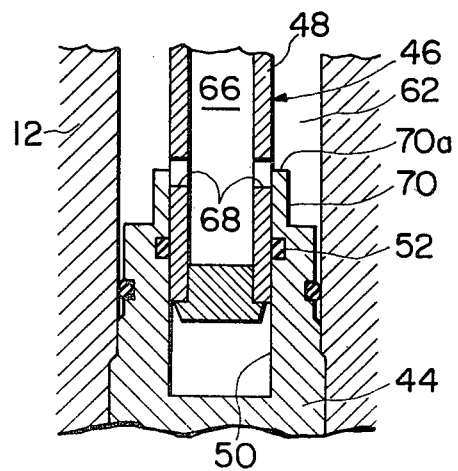
FIG. 4 is a partial sectional view of a pressure reducer device, showing a third preferred embodiment of the present invention.

FIG. 4 shows still another embodiment of the present invention. This embodiment is different from the embodiment shown in FIG. 1 in that a modified sleeve valve is used. In this modified sleeve valve ports 68 formed in a cylindrical portion 48 is valved by top flat edge 70a of a sleeve 70. The manner of operation of this embodiment is the same as that of the foregoing description. The stroke of a valve element 48 can be reduced to obtain stable kinetic movement of the valve element 48 if the valve ports 68 of the cylindrical portion 48 are shaped such that as the valve element 46 moves from one dead position to the other dead position opening area of the sleeve valve varies substantially quadraticly.

What is claimed is:

1. In a pressure reducer device, for hydraulic brake systems in motor vehicles, comprising:

a housing having a bore;

pressure responsive valve means within said bore of said housing having a cylindrical portion having a closed bore and a land portion projecting radially from said cylindrical portion, said land portion sealingly engaging said bore of said housing to axially divide the same into a high pressure chamber and a low pressure chamber, said cylindrical portion having at least one valve port at that side thereof from said land portion which is exposed to said high pressure chamber and at least one opening at that side thereof from said land portion which is exposed to said low pressure chamber, said at least one valve port opening to said closed bore of said cylindrical portion, said at least one opening opening to said closed bore of said cylindrical portion;

an end plug closing one end of said bore of said housing, said end plug having a blind bore sealingly and slidably receiving said that side of said cylindrical portion which is exposed to said high pressure chamber, said end plug having an integral sleeve disposed coaxially with and in alignment with said blind bore, said pressure responsive valve means having a first effective area exposed to said high pressure chamber pressure and a second effective area exposed to said low pressure chamber pressure after closure of said at least one valve port by said sleeve; and spring means biasing said pressure responsive valve means in a direction assisting said high pressure chamber pressure;

the force applied to said pressure responsive valve means by pressure acting on said second effective area after the closure of said at least one valve port by said sleeve biasing said pressure responsive valve means to a closed position against the force of said spring means;

the improvement comprising said sleeve slidably receiving that side of said cylindrical portion which is exposed to said high pressure chamber to open and close said at least one valve port to limit transmission of pressure from said high pressure chamber to said low pressure chamber through said at least one valve port, said closed bore of said cylindrical portion and said opening without the the presence of a seal.

2. A pressure reducer device as claimed in claim 1, in which said integral sleeve is formed with at least one valve port adapted to stay in lap position with said at least one valve port of said cylindrical portion.

3. A pressure reducer device as claimed in claim 1, in which said integral sleeve has an edge adapted to stay in lap position with said at least one valve port of said cylindrical portion.

4. A pressure reducer device, for hydraulic brake systems in motor vehicles, comprising:

a housing having a bore;

a pressure responsive valve element movable within said bore of said housing between one dead position and another dead position, said pressure responsive valve element having a cylindrical portion having a closed bore and a land portion projecting radially from said cylindrical portion, said land portion sealingly engaging said bore of said housing to axially divide the same into a high pressure chamber and a low pressure chamber, said cylindrical portion having a plurality of valve ports at the side thereof from said land portion which is exposed to said high pressure chamber and at least one opening at that opposite side thereof from said land portion which is exposed to said low pressure chamber, said plurality of valve ports opening to said closed bore of said cylindrical portion, said at least one opening opening to said closed bore of said cylindrical portion;

an end plug closing one end of said bore of said housing, said end plug having a blind bore sealingly and slidably receiving said that side of said cylindrical portion which is exposed to said high pressure chamber, said end plug having an integral sleeve disposed coaxially with and in alignment with said blind bore, said sleeve slidably receiving that side of said cylindrical portion which is exposed to said high pressure chamber to close said plurality of valve ports of said cylindrical portion to close transmission of pressure from said high pressure chamber to said low pressure chamber through said plurality of valve ports, said closed bore of said cylindrical portion and said at least one opening, said integral sleeve having a plurality, corresponding in number to said plurality of valve ports of said cylindrical portion, of valve ports adapted to stay in lap position with said plurality of valve ports of said cylindrical portion, respectively, to open transmission of pressure from said high pressure chamber to said low pressure chamber through said plurality of valve ports of said cylindrical portion, said closed bore of said cylindrical portion and said at least one opening, said pressure responsive valve element having a first effective area exposed to said high pressure chamber and a second effective area exposed to said low pressure chamber pressure after closure of said plurality of valve ports of said cylindrical portion by said integral sleeve; and spring means biasing said pressure responsive valve element in a direction assisting said high pressure chamber pressure;

the force applied to said pressure responsive valve element by pressure acting on said second effective area after the closure of said plurality of valve ports of said cylindrical portion by said sleeve biasing said pressure responsive valve element in a direction opposing the force of said spring means.

5. In a dual hydraulic brake system having front and rear brake cylinders and a dual master cylinder for separately pressurizing said front and rear brake cylinders, a pressure reducer device comprising:

a housing having a bore;

a pressure responsive valve element movable within said bore of said housing, said pressure responsive valve element having a cylindrical portion having a closed bore and a land portion projecting radially from said cylindrical portion, said land portion sealingly engaging said bore of said housing to axially divide the same into a high pressure chamber communicating with rear system master cylinder pressure and into a low pressure chamber communicating with rear brake pressure, said cylindrical portion having a plurality of valve ports at that side thereof from said land portion which is exposed to said high pressure chamber and at least one opening at that opposite side thereof from said land portion which is exposed to said low pressure chamber, said plurality of valve ports opening to said closed bore of said cylindrical portion, said at least one opening opening to said closed bore of said cylinrical portion;

an end plug closing one end of said bore of said housing, said end plug having a blind bore sealingly and slidably receiving said that side of said cylindrical portion which is exposed to said high pressure chamber, said end plug having an integral sleeve disposed coaxially with and in alignment with said blind bore, said sleeve slidably receiving that side of said cylindrical portion which is exposed to said high pressure chamber to close said plurality of valve ports of said cylindrical portion to close transmission of pressure from said high pressure chamber to said low pressure chamber through said plurality of valve ports, said closed bore of said cylindrical portion and said at least one opening, said integral sleeve having a plurality of valve ports corresponding in number to said plurality of valve ports of said cylindrical portion, adapted to stay in lap position with said plurality of valve ports of said cylindrical portion, respectively, to open transmission of pressure from said high pressure chamber to said low pressure chamber through said plurality of valve ports of said cylindrical portion, said closed bore of said cylindrical portion and said at least one opening, said plurality of valve ports of said integral sleeve and said plurality of valve ports of said cylindrical portion being shaped such that as said cylindrical portion moves from one dead position to another dead position, an opening area of each of said plurality of valve ports of said cylindrical portion varies substantially quadratically;

said pressure responsive valve element having a first effective area exposed to the rear system master cylinder pressure, a second effective area exposed to the rear brake pressure after closure of said plurality of valve ports of said cylindrical portion and a third effective area exposed to front system brake pressure; and spring means biasing said pressure responsive valve element in a direction assisting the rear system master cylinder pressure;

the force applied to said pressure responsive valve element by pressure acting on said second and third effective areas biasing said pressure responsive valve element in a direction opposing the bias of said spring means, said third effective area being sealed from said first and second effective areas whereby a failure in front brake pressure will substantially modify the functioning of said pressure responsive valve element.

6. In a dual hydraulic brake system having front and rear brake cylinders and a dual master cylinder for separately pressurizing said front and rear brake cylinders, a pressure reducer device comprising:

a housing having a bore;

a pressure responsive valve element movable within said bore of said housing, said pressure responsive valve element having a cylindrical portion having a closed bore and a land portion projecting radially from said cylindrical portion, said land portion sealingly engaging said bore of said housing to axially divide the same into a high pressure chamber communicating with rear system master cylinder pressure and into a low pressure chamber communicating with rear brake pressure, said cylindrical portion having a plurality of valve ports at that side thereof from said land portion which is exposed to said high pressure and at least one opening at that opposite side thereof from said land portion which is exposed to said low pressure chamber, said plurality of valve ports opening to said closed bore of said cylindrical portion, said at least one opening opening to said closed bore of said cylindrical portion;

an end plug closing one end of said bore of said housing, said end plug having a blind bore sealingly and slidably receiving said that side of said cylindrical portion which is exposed to said high pressure chamber, said end plug having an integral sleeve disposed coaxially with and in alignment with said blind bore, said sleeve slidably receiving that side of said cylindrical portion which is exposed to said high pressure chamber to close said plurality of valve ports of said cylindrical portion to close transmission of pressure from said high pressure chamber to said low pressure chamber through said plurality of valve ports, said closed bore of said cylindrical portion and said at least one opening, said sleeve having an edge adapted to stay in lap position with said plurality of valve ports of said cylindrical portion to open transmission of pressure from said high pressure chamber to said low pressure chamber through said plurality of valve ports of said cylindrical portion, said closed bore of said cylindrical portion to said at least one opening, said pressure responsive valve element having a first effective area exposed to the rear system master cylinder pressure, a second effective area exposed to the rear brake pressure after closure of said plurality of valve ports of said cylindrical portion and a third effective area exposed to front system brake pressure; and spring means biasing said pressure responsive valve element in a direction assisting the rear system master cylinder pressure;

the force applied to said pressure responsive valve element by pressure acting on said second and third effective areas biasing said pressure responsive valve element in a direction opposing the bias of said spring means, said third effective area being sealed from said first and second effective areas whereby a failure in front brake pressure will substantially modify the functioning of said pressure responsive valve element.

* * * * *